United States Patent [19]

Todd et al.

[11] Patent Number: 4,682,993
[45] Date of Patent: Jul. 28, 1987

[54] FLUID FILTER SYSTEM WITH REPLACEABLE FILTER ELEMENT

[75] Inventors: Christian A. Todd, Denver; William D. Hart, Louisville, both of Colo.

[73] Assignee: Storage Technology Corporation, Louisville, Colo.

[21] Appl. No.: 729,377

[22] Filed: May 1, 1985

Related U.S. Application Data

[63] Continuation of Ser. No. 562,386, Dec. 16, 1983, abandoned.

[51] Int. Cl.$^4$ ............................................. B01D 46/44
[52] U.S. Cl. ........................................ 55/314; 55/422; 55/481; 55/493; 55/506; 210/235
[58] Field of Search ............... 55/312, 314, 422, 480, 55/481, 493, 506, DIG. 31; 210/234, 235

[56] References Cited

U.S. PATENT DOCUMENTS

| | | | |
|---|---|---|---|
| 3,887,341 | 6/1975 | Sutter | 55/314 |
| 3,898,065 | 8/1975 | Coffman | 55/314 |
| 4,198,221 | 4/1980 | Catlin et al. | 55/481 |
| 4,339,333 | 7/1982 | Stöberg | 55/314 |

*Primary Examiner*—David L. Lacey
*Attorney, Agent, or Firm*—Woodcock Washburn Kurtz Mackiewicz & Norris

[57] ABSTRACT

An air filter system, with a replaceable cartridge, suitable for use in controlled environment systems such as computer information storage and retrieval devices. The system provides ease of maintenance, while providing a highly sanitized air stream to an optical device, over prolonged periods of operation, for temperature control of temperature sensitive areas. The system is comprised of a housing plenum located in the controlled environment system, the housing having a sliding filter tray, a plurality of air flow ports and a spring biased valve gate. When the filter tray is fully inserted in the housing, the valve gate is forced open so that the air flow is into the controlled environment, but when fully retracted the valve gate closes, causing the air to exit the system through an exhaust port.

3 Claims, 4 Drawing Figures

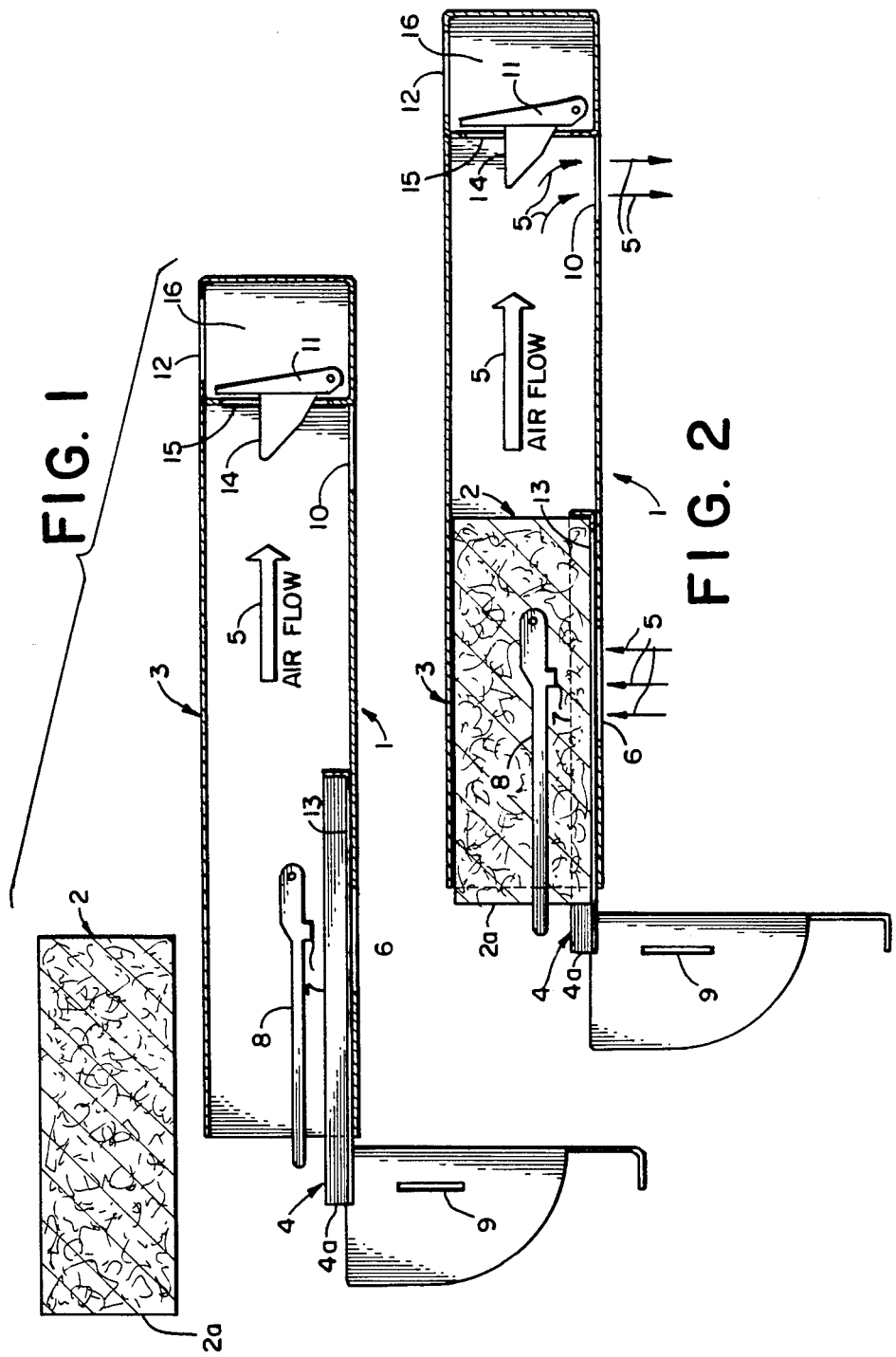

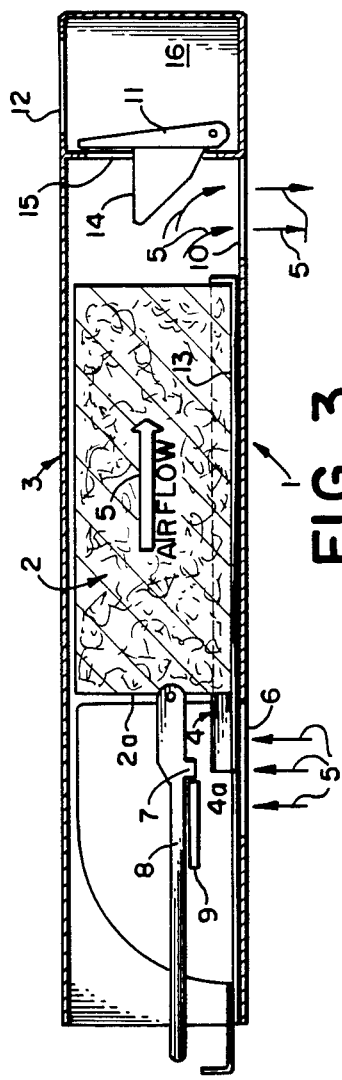
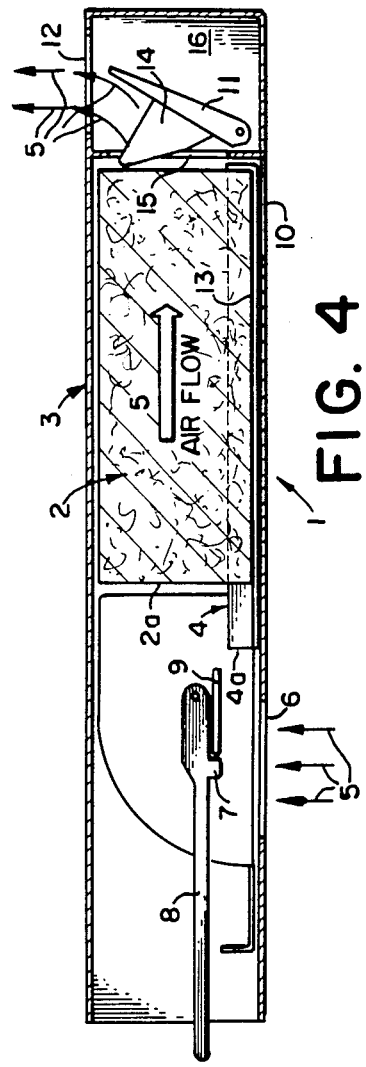

FLUID FILTER SYSTEM WITH REPLACEABLE FILTER ELEMENT

This application is a continuation of application Ser. No. 562,386, now abandoned, filed 12/16/83.

BACKGROUND OF THE INVENTION

The disclosed invention relates to the field of filter systems for fluid handling devices, and in particular to integral air handling techniques designed into computer equipment for maintaining temperature control of delicate electronic components, and even more particularly, to optical information storage and retrieval devices.

The use of filter systems and in particular air filter systems in such computer equipment has become common because of the detrimental effects of accumulative contamination over prolonged periods of operation.

The prior art has relied heavily upon the thermal chimney effect to move cooler air into high temperature areas. In the prior art, a wide range of means have been developed to reduce the accumulated contamination which results from the continual circulation of air throughout the device. The sensitivity to contamination is most critical in equipment which contains assemblies and sub-assemblies which must be sealed and protected against the hostile environment outside the delicately clean manufacturing facilities where they are assembled.

The prior art has addressed these problems in part by placing filter barriers in the air flow path of the major contributing air streams. Reduction in accumulated contamination is achieved by periodically removing the old filters and replacing them with new ones. While installing new filters addresses the accumulated contamination problem and allows sufficient air flow through the system, removing the old filter from its installed position usually releases a relatively substantial quantity of residual contamination which remains in the filter chamber of the air filter system. Also, the new filter itself usually contains contaminates which are able to enter the filter system.

What is needed, therefore, is an efficient air filtering system that not only removes contaminates from the circulating air, but which also prevents contamination of the system during filter replacement.

BRIEF SUMMARY OF THE INVENTION

The present invention provides a unique filtering system which protects delicate areas of the equipment it serves by purging residual contaminates from the filter element chamber when cleaning or replacing the old filter and by purging contaminants from the new filter prior to the new filter passing air into the device filter system.

The filter system, is designed to contain the major concentration of contaminates within a controlled environment, such as an information storage and retrieval device. The present invention provides significant improvement in not only containing the concentration of said contaminates, but also in providing the ability to remove old filters, and installing new, without contaminating the system.

First, the enclosing design of the housing plenum establishes a specific air flow path which eliminates errant random air flow from other areas of the controlled environment. Secondly, manual removal of the air filter element from the housing plenum necessarily isolates the air filter system from the controlled environment, thereby allowing the air filter system to be cleaned and purged of contaminates before being returned to normal operating service. Then, upon insertion of a new filter, the air flow through the new filter prior to opening a flow channel into the device, allows the new filter to also be purged prior to allowing flow into the device filter system.

The present invention is a compact fluid filter system having a replaceable filter element. All components are contained within a single-housing plenum having a sliding filter tray which contains the filter element. Fluid travel through the housing plenum may be accomplished by applying positive pressure at the entrance portal, or by applying negative pressure to either the exhaust portal, when the filter system is in the purging mode, or the operating portal, when the filter system is in the normal operating mode. Advantageously, the purging mode allows for the efficient cleaning of the filter tray chamber when the tray is retracted during filter changing. By directing the fluid stream from the entrance portal, through the filter chamber and out through the exhaust port, the release of residual chamber contamination into the device is avoided.

Upon satisfactorily purging the filter system chambers, the new filter is inserted in the tray, and slid into place in the housing. A base portion of the filter tray seals off the exhaust portal, and the end of the tray actuates a spring loaded valve so that the filtered fluid flows out through the normal operating portal into the device. Additionally, the fluid flow through the new filter, as the new filter is moved forward, causes the new filter to be cleaned prior to complete insertion into the device.

Finally, in the preferred embodiment, the housing plenum is designed so that the device cover cannot be closed if the housing is not fully inserted, and additionally, if the cover is made part of a safety system, the device cannot be operated if the cover is not fully closed.

BRIEF DESCRIPTION OF THE DRAWINGS

FIG. 1 is a cross section pictorial representation of the disclosed invention showing the basic elements with the filter removed, allowing the housing plenum to be purged.

FIG. 2 is a cross section pictorial representation of the disclosed invention showing the fully extended housing plenum with a new filter inserted.

FIG. 3 is a cross section pictorial representation of the disclosed invention showing the basic elements thereof located in the position designed for purging contaminates from the new filter disposed therein.

FIG. 4 is a cross section pictorial representation of the disclosed invention showing the basic elements thereof fully inserted into the housing plenum for normal operating usage.

DETAILED DESCRIPTION OF PREFERRED EMBODIMENT

The following description of the preferred embodiment sets forth the best presently contemplated means for carrying out the present invention. This description is presented solely for the purpose of describing the essential principles of the present invention and should not be interpreted as limiting the true scope of the invention as outlined in the appended claims.

FIG. 1 illustrates the configuration of the present invention, a replaceable filter system 1, for purging latent contaminates from the filter system when removing and replacing filter element 2 shown fully retracted from the system 1. In the preferred embodiment the housing plenum 3 is stationary and rigidly attached to, or located in, the optical information storage and retrieval device which it services. As shown in FIG. 2, the replaceable filter element 2 is loaded in a tray 4 having a rim portion 4a and a base portion 13 for insertion into the housing plenum 3. Like most trays, the tray 4 is an open receptacle with a flat bottom comprising the base portion 13 and a low rim comprising the rim portion 4a for holding or carrying the filter element 2. As such, when the filter element 2 is carried within the tray 4 a substantial portion of the filter element 2 is exposed. Then, as shown in FIG. 3, the tray 4, with the filter element 2 placed therein, is moved (either manually or automatically) to a first, partially inserted position in the housing plenum 3. Once in this partially inserted position, an air flow 5 can be started, the air flow 5 entering the housing plenum 3 through the air entry portal 6 and thence through one side 2a of the filter element 2. The partially inserted filter tray 4 is disposed against the inner edge of detent tab 7 of positioning lever 8, shown in FIG. 3, which cooperates with the catch 9 to lock tray 4 into this first position. Also in FIG. 3, air flow 5 is directed into filter element 2 for cleaning this new filter element 2 of any initial contaminates. As the air stream 5 flows through filter element 2 foreign contaminate particles are removed to exit the filter element 2, and the system 1 through exhaust portal 10. In this fashion, the filter system 1 is itself purged of residual contamination following a filter change or other maintenance disturbances. Also, in this position the air stream 5 can clean the newly inserted filter element 2 of any initial contamination it may contain.

FIG. 4 illustrates the configuration of the present invention for normal air filter operations, showing the filter 2 and filter tray 4 fully inserted with detent tab 7 cooperating with catch 9 to lock the tray 4 fully in place. It is important to note that filter tray 4 and filter element 2 are diposed in the forwardmost position which places the spring loaded valve gate 11 in an unsealed, open, position. Thus, the operating portal 12 is in communication with the filter tray 4, while the exhaust portal 10 is sealed off by the base 13 of the filter 2. If not in this forwardmost position, improper filtration can occur. Therefore, in the preferred embodiment, the positioning lever 8 is designed to prevent a cover (not shown) from closing, thus providing a positive indication that the filter tray 4 is not fully inserted. Additionally, the cover can be connected into the device safety circuit such that if the cover is not closed, the device will not operate.

The filter tray 4 and filter element 2 are placed in the forwardmost position by lifting positioning lever 8 and sliding filter tray 4 forward until positioning lever 8 cooperates with catch 9, locking the filter tray 4 in place. This sliding action forces the filter tray 4 and filter element 2 to come into contact with the forwardmost end surface of said housing plenum 3. Thus, the base 13 of the filter tray 4 seals off the exhaust port 10, while the forward motion of filter tray 4 against the arm 14 of spring biased valve gate 11 forces the valve 11 to open allowing an air flow 17 to pass through channel 15 into the second chamber 16 and thereafter out through operating port 12 into the device.

We claim:

1. A fluid filter system having a replaceable filter element and comprising;
   a housing plenum having:
   a first interior chamber with an entrance port and an exhaust port located therein; and
   a second interior chamber, in communication with the first chamber through an interconnecting passage, having an exhaust port located therein; and
   means for positioning the filter element in the housing plenum in a first position between the entrance port and the exhaust port in said first interior chamber and for moving the filter element to a second position between the entrance port and the interconnecting passage, said means for positioning the filter element having:
   means constructed so as to prevent fluid flow through the exhaust port in said first interior chamber, and said system further comprises;
   means constructed and arranged so as to be moved by said means for positioning for preventing fluid flow through the interconnecting passage whenever the filter element is not in the second position, said means for preventing fluid flow through the interconnecting passage positioned and arranged so as to be moved to an open position by said means for preventing fluid flow through the exhaust port in said first interior chamber whereby said interconnecting passage is open when the exhaust port in said first interior chamber is closed.

2. The fluid filter system of claim 1 wherein the means for positioning the filter element comprises a filter tray carrying the filter element between the first and second positions slidably disposed in the housing plenum, the tray including a base portion and a rim portion constructed so as to expose one side of the filter element to the entrance port of the housing plenum when the filter element is in the first or second positions, thereby defining a first fluid flow path through said filter element from said entrance port to the exhaust port in said first interior chamber when the filter element is in the first position, and defining a second fluid flow path through said filter element from said entrance port to the interconnecting passage when the filter element is in the second position, the base portion comprising said means for preventing fluid flow through the exhaust port in said first interior chamber by sealably covering the exhaust port in said first interior chamber when the filter element is in the second position.

3. The fluid filter system of claim 2 wherein the means preventing fluid flow through the interconnecting passage comprises a valve rotatably attached to the interconnecting passage, the valve being constructed and arranged so as to be moved by the filter element when the filter moves from the first position to the second position said valve fully closes the interconnecting passage when said filter element is in said first position and opens the interconnecting passage when said filter element is in said second position, thereby defining said second fluid flow path and extending said second fluid flow path through the exhaust port in said second interior chamber.

* * * * *